United States Patent
Mizukami

(10) Patent No.: US 8,338,704 B2
(45) Date of Patent: Dec. 25, 2012

(54) ELECTRICAL JUNCTION BOX

(75) Inventor: Shunsuke Mizukami, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 300 days.

(21) Appl. No.: 12/801,078

(22) Filed: May 20, 2010

(65) Prior Publication Data

US 2010/0326718 A1    Dec. 30, 2010

(30) Foreign Application Priority Data

Jun. 24, 2009  (JP) .................. 2009-150237

(51) Int. Cl.
   *H05K 7/00*    (2006.01)
(52) U.S. Cl. ......... 174/50; 174/520; 439/76.1; 439/76.2
(58) Field of Classification Search ............ 174/50, 174/520, 59, 17 R; 439/620.24, 374, 76.1, 439/76.2, 949, 535, 250, 360, 620.3; 220/3.2–3.9, 220/4.02; 361/600, 601, 679.01, 715, 708, 361/642, 646

See application file for complete search history.

(56) References Cited

U.S. PATENT DOCUMENTS

| | | | |
|---|---|---|---|
| 5,011,417 A * | 4/1991 | Matsumoto et al. ......... | 439/76.2 |
| 5,023,752 A * | 6/1991 | Detter et al. ............... | 439/76.2 |
| 5,145,414 A | 9/1992 | Oikawa | |
| 5,221,217 A | 6/1993 | Oikawa | |
| 5,632,654 A | 5/1997 | Sugiura | |
| 6,796,809 B2 * | 9/2004 | Kakuta et al. ............... | 439/76.2 |
| 7,129,410 B2 * | 10/2006 | Kanazawa .................... | 174/50 |
| 7,156,677 B2 * | 1/2007 | Yamane ....................... | 439/949 |
| 7,883,342 B2 * | 2/2011 | Yoshida et al. ............. | 439/76.2 |
| 7,893,364 B2 * | 2/2011 | Oda ............................ | 174/520 |

FOREIGN PATENT DOCUMENTS

| | | |
|---|---|---|
| JP | U-61-145454 | 9/1986 |
| JP | A-08-195161 | 7/1996 |
| JP | A-11-069569 | 3/1999 |
| JP | A-2000-082379 | 3/2000 |
| JP | A-2001-204126 | 7/2001 |
| JP | A-2004-080966 | 3/2004 |

\* cited by examiner

*Primary Examiner* — Angel R Estrada
(74) *Attorney, Agent, or Firm* — Oliff & Berridge, PLC

(57) ABSTRACT

To provide an electrical junction box having a new structure that can prevent an unused fuse from being broken and can easily house and remove the unused fuse. A casing body 12 is provided with an unused fuse containing section 24 that is open in the same direction as an opening direction of the casing body 12. The unused fuse containing section 24 is provided on a periphery with at least one protective wall 28. A cover member 14 for closing an opening 16 in the casing body 12 is provided at a position opposed to the unused fuse containing section 24 with a presser portion 66 for preventing an unused fuse 36 from disconnecting from the unused fuse containing section 24.

4 Claims, 6 Drawing Sheets

ELECTRICAL JUNCTION BOX

INCORPORATION BY REFERENCE

This application claims priority to JP 2009-150237 filed in Japan on Jun. 24, 2009, the disclosure of which is hereby incorporated by reference in its entirety.

BACKGROUND

This invention relates to an electrical junction box to be mounted on a motor vehicle or the like and more particularly relates to an electrical junction box that includes a structure that can hold an unused fuse.

Heretofore, electrical circuits in a motor vehicle or the like are provided with fuses that prevent overcurrents. The fuses are assembled and arranged in an electrical junction box such as a fuse box. When any one of fuses is melted by the overcurrents, the melted fuse must be replaced with a new fuse in the electrical junction box. When a dark current circuit such as a watch that consumes an electrical power all the time is shut off, a dark current fuse must be removed from a fuse mounting section.

Currently, a particular electrical junction box has been proposed. The particular electrical junction box includes a casing body provided with an unused fuse containing section that houses an unused fuse such as a spare fuse, a dark current fuse removed temporarily, or the like. Such electrical junction box has been disclosed in, for example, JP HEI 11(1999)-69569 A [Patent Document 1] and JP HEI 8(1996)-195161 A [Patent Document 2].

However, the electrical junction box disclosed in the above Patent Documents holds the unused fuse in an unused fuse containing section firmly in order to prevent the unused fuse from being disconnected on account of vibrations from the vehicle by using a locking mechanism (Patent Document 1) or by forming the unused fuse containing section from a special-purpose holding member (Patent Document 2). Consequently, there were some problems that a work of attaching and detaching the fuse to and from the electrical junction box or that an undue force is applied to the fuse, which may damage the fuse. When the fuse is removed from the unused fuse containing section, a special tool such as a fuse puller or a jig has been often required.

In the case where the electrical junction box is disposed in an engine room, because the engine room is narrow in space, a cover member must be applied to the casing body when opening and closing the cover member to exchange the fuses. Consequently, there have been problems that the cover member collides with the fuse to cause the fuse to fall down or to be broken.

SUMMARY

In view of the above problems, one preferred embodiment provides an electrical junction box having a new structure that can prevent an unused fuse from being broken and can easily house the fuse while allowing it to be easily removed.

A first aspect of a preferred embodiment is directed to an electrical junction box that has a casing body and a cover member for closing an opening in the casing body. The casing body is provided with an unused fuse containing section that is open toward the opening in the casing body. The unused fuse containing section is provided on a periphery with at least one protective wall. The cover member is provided at a position opposite to the unused fuse containing section with a presser portion that prevents an unused fuse from disconnecting from the unused fuse containing section.

In accordance with a preferred embodiment, the presser portion is configured opposite to the unused fuse that is housed in the unused fuse containing section when the cover member is attached to the casing body. Thus, when the unused fuse is unintentionally loosened from the unused fuse containing section on account of vibrations of the vehicle, the presser portion collides with the unused fuse to restrain the unused fuse, thereby preventing unintentional disconnection of the unused fuse. Because the presser portion prevents disconnection of the unused fuse, the unused fuse containing section is not required to apply a strong holding force to the fuse, and instead can apply a weak holding force or no holding force at all to the fuse. As a result, it is possible to easily attach and detach the unused fuse to and from the unused fuse containing section without using a special tool while preventing unintentional disconnection of the unused fuse.

In other words, it is preferable that the disconnection preventing function for the unused fuse is applied only when the cover member is in a closed position and that the unused fuse can be easily attached to or detached from the unused fuse containing section when the cover member is in an open position. Accordingly, because the disconnection preventing mechanism using the presser portion is provided on the cover member and exerts a disconnection preventing function in association with opening and closing operations of the cover member, it is possible to detachably hold the unused fuse in the unused fuse containing section while preventing the disconnection of the fuse without increasing the number of special parts. Further, because the disconnection preventing function is associated with the opening and closing operations of the cover member, it is possible to perform and release the function without requiring any special operation.

Further, according to a preferred embodiment, because the at least one protective wall is provided on the periphery of the unused fuse containing section, it is possible to prevent the unused fuse that is housed in the unused fuse containing section from colliding with the other member. Thus, even if the cover member is forced against the casing body in, for example, a narrow engine room, it is possible to prevent the cover member from colliding against the unused fuse. Particularly, according to the preferred embodiment, the at least one protective wall can cover the side of the unused fuse. Although a fuse is small and brittle in general, because the fuse must be pushed into the fuse mounting section, the fuse has a certain degree of strength in along the pushing direction. Accordingly, while the presser portion acts to push the reinforced side of the fuse, the at least one protective wall protects the side of the fuse, thereby exerting the disconnection preventing function and damage protective function on the fuse.

In a second preferred embodiment, which is combinable with the first preferred embodiment, the at least one protective wall is configured with a height that is higher than a distal end surface of the unused fuse housed in the unused fuse containing section. According to this structure, it is possible to prevent the unused fuse from protruding from the at least one protective wall. Thus, it is possible to more surely prevent the other member, such as the cover member of the electrical junction box, from colliding with the unused fuse.

In a third preferred embodiment, which is combinable with the first and second preferred embodiments, the at least one protective wall is provided on at least opposite ends of the unused fuse containing section. According to the third preferred embodiment, it is possible to more effectively prevent interference between the unused fuse housed in the unused fuse containing section and the other member. For example, even if the cover member of the electrical junction box is removed in a narrow space such as an engine room, it is possible to prevent the cover member from colliding with the unused fuse when the cover approaches the casing body from any directions. It is more preferable in the third preferred embodiment that the at least one protective wall is formed into a U-shaped configuration. According to this configuration, it is possible to enhance strength of the unused fuse containing section. Also, because the at least one protective wall can protect two adjacent (orthogonal) surfaces of the unused fuse, it is possible to more effectively prevent the other member from colliding with the unused fuse.

In a fourth preferred embodiment, which is combinable with the above embodiments, the presser portion is opposite to the unused fuse containing section with a clearance spaced apart from the unused fuse housed in the unused fuse containing section when the cover member is attached to the casing body. In the fourth preferred embodiment, when the unused fuse moves in a disconnecting direction from the unused fuse containing section due to vibrations of the vehicle, the unused fuse collides with the presser portion to restrain an amount of displacement, thereby holding the unused fuse in the unused fuse containing section. Thus, when the cover member is attached to the casing body, it is possible to avoid interference between the unused fuse and the presser portion without causing an awkward fitting, thereby facilitating the assembly and stability between the cover member and the casing body.

In a fifth preferred embodiment, which is combinable with the above embodiments, a drain hole is provided in the casing body to be disposed on areas adjacent to the unused fuse containing section. Many unused fuse containing sections that are not connected to electrical circuits are formed into configurations that are open at one side and have bottom walls. Accordingly, by adopting the fifth aspect, it is possible to eliminate or reduce water that accumulates in the unused fuse containing section and to prevent the water accumulating in the section from overflowing, thereby prevent the overflowing water from short the other electrical parts.

According to the preferred embodiments, the presser portion provided on the cover member can prevent the unused fuse from the unused fuse containing section. Thus, it is not necessary to firmly hold the unused fuse in the unused fuse containing section, thereby allowing for the easy attachment and detachment of the unused fuse to and from the unused fuse containing section. At the same time, because the at least one protective wall is provided on the unused fuse containing section, it is possible to prevent the other member from colliding with the unused fuse housed in the unused fuse containing section.

DETAILED DESCRIPTION OF EMBODIMENTS

Figure 1:
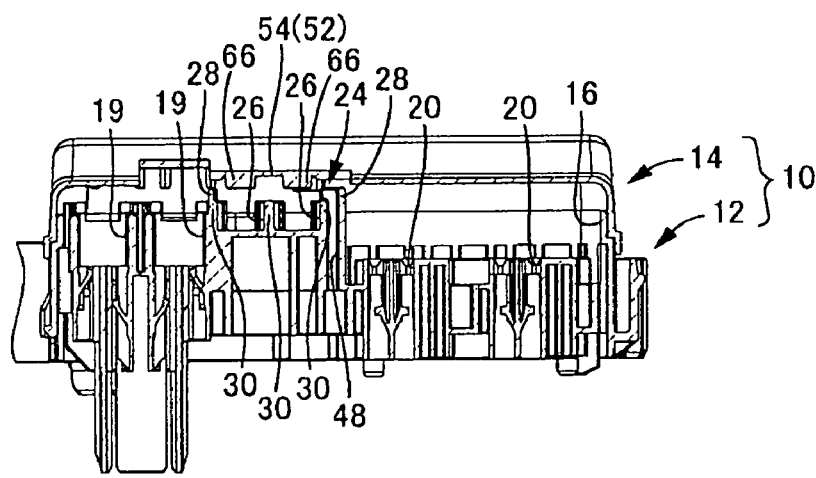
FIG. 1 is a cross section view taken along lines I-I in FIG. 3, illustrating an embodiment of an electrical junction box in accordance with the present invention.

Referring now to the drawings, embodiments of an electrical junction box in accordance with the present invention will be described below. In general, references to top and bottom surfaces are described with respect to the electrical junction box in the installed position in which the casing body 12 is below the cover member 14.

Figure 2:
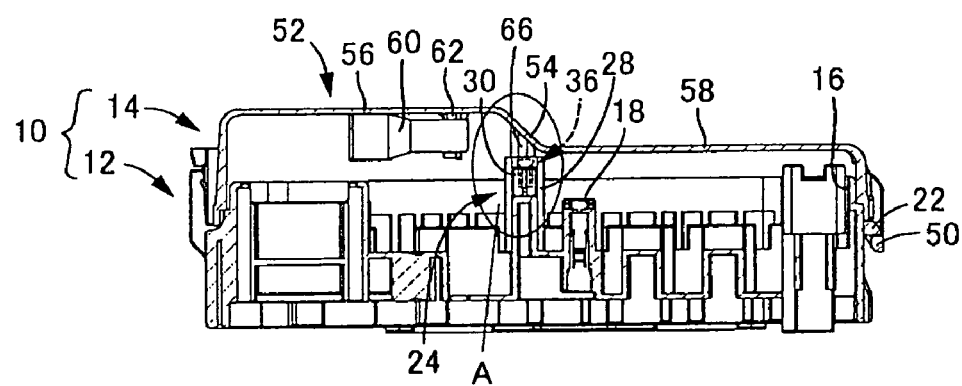
FIG. 2 is a longitudinal section view taken along lines II-II in FIG. 3, illustrating an embodiment of the electrical junction box shown in FIG. 1.

FIGS. 1 and 2 show a relay box 10 that is an embodiment of an electrical junction box in accordance with the present invention. The relay box 10 includes a casing body 12 and a cover member 14 for covering the casing body 12. The electrical junction box is not limited to the disclosed relay box. The electrical junction box may be a junction block, a fuse box, or the like.

Figure 3:
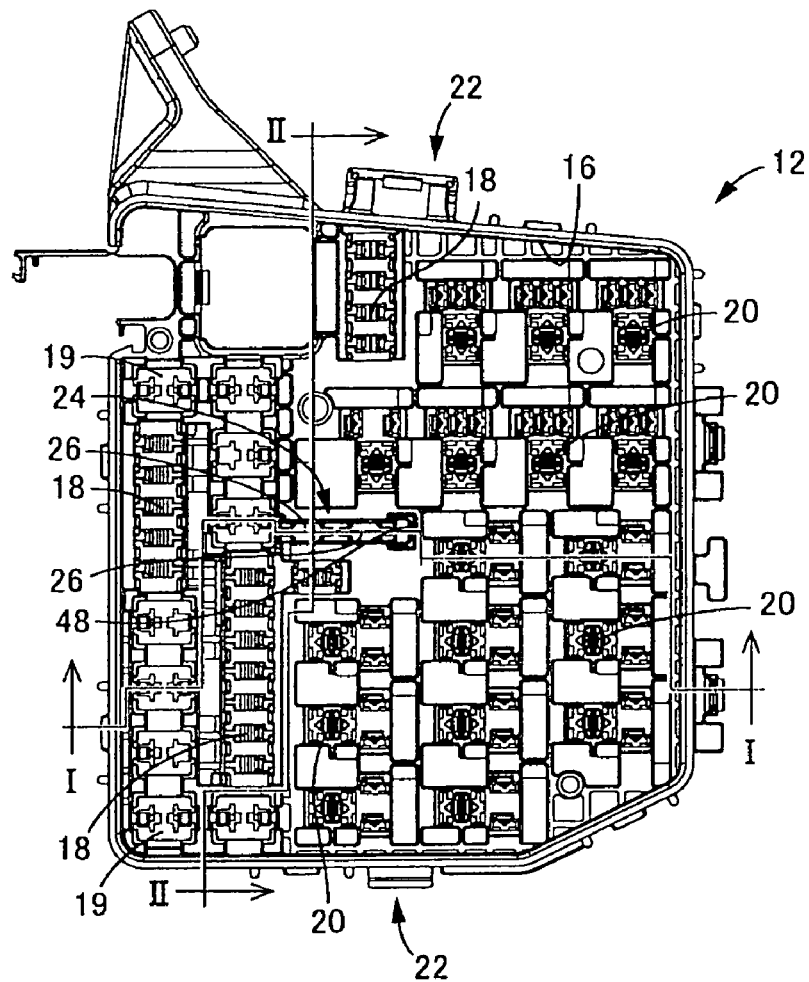
FIG. 3 is a top plan view of a casing body constituting the electrical junction box shown in FIG. 1.

FIG. 3 shows the casing body 12. The casing body 12 can be formed into a substantially rectangular parallelepiped configuration made of a synthetic resin material and having an opening 16 that is generally open upward in the direction of installation. The casing body 12 can be provided with a fuse mounting section 18, a fusible link mounting section 19, a relay mounting section 20, and the like. The casing body 12 can also be provided on suitable positions on an outer peripheral surface with body side locking portions 22 for securing the cover member 14 to the casing body 12.

Figure 4:
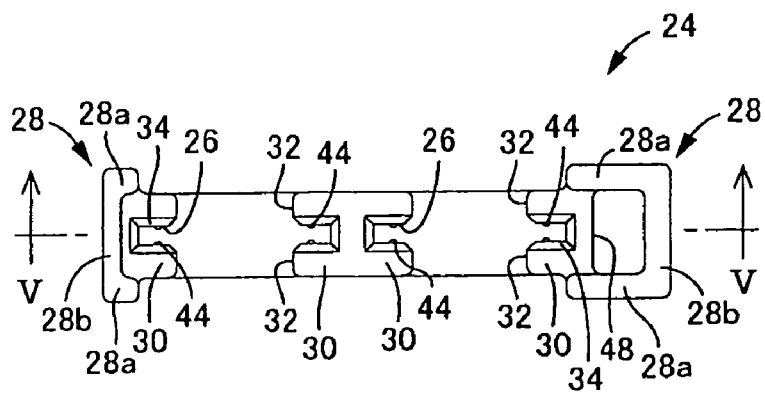
FIG. 4 is a top plan view of an unused fuse containing section to be provided in the casing body shown in FIG. 3.
Figure 5:
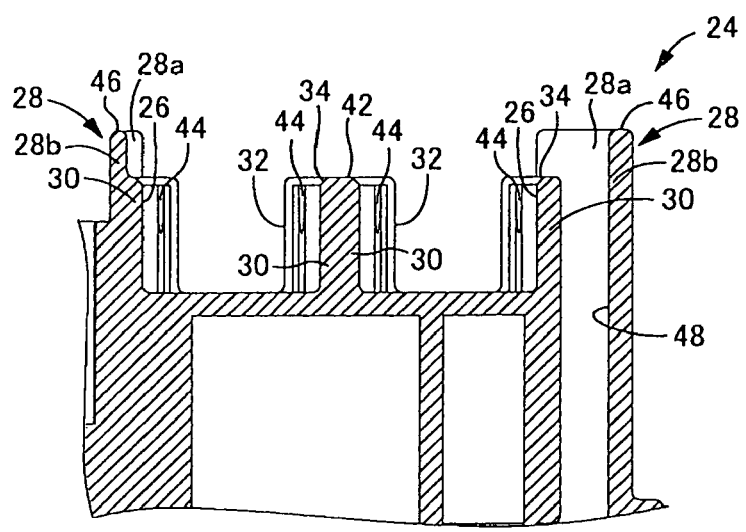
FIG. 5 is a longitudinal section view taken along lines V-V in FIG. 4, illustrating the unused fuse containing section.

Further, an unused fuse containing section 24 can be integrated with the casing body 12. FIGS. 4 and 5 show the unused fuse containing section 24. The unused fuse containing section 24 includes a pair of fuse insertion portions 26. A pair of protective walls 28 are provided on opposite ends of the unused fuse containing section 24 to interpose the fuse insertion portions 26.

The pair of fuse insertion portions 26 have the same configurations, respectively. Each fuse insertion portion 26 can be formed into a substantially rectangular recess that has a bottom wall and an opening that is generally open upward, as is the case with the casing body 12. The fuse insertion portion 26 can be surrounded by a generally U-shaped outer wall 30 at opposite ends in a longitudinal direction. Thus, the fuse insertion portion 26 can be provided in a central part in a longitudinal direction with side openings 32 that are open at opposite side walls between outer walls 30. The respective outer walls 30 interposed between the pair of fuse insertion portions 26 are interconnected to each other to form H-shaped configurations. An opening end surface 34 can be formed into a slant surface having a great opening size toward the opening direction so that a fuse 36 mentioned after can be easily inserted into the fuse insertion portion 26.

Figure 6:
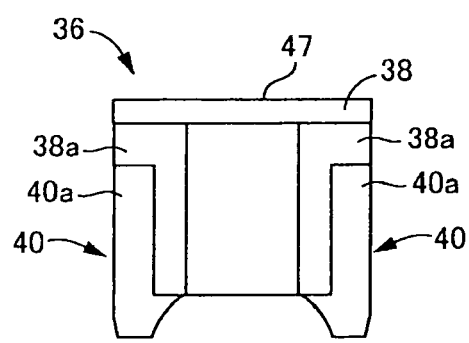
FIG. 6A is a front elevation view of an unused fuse.
FIG. 6B is a side elevation view of the unused fuse.
Figure 6:
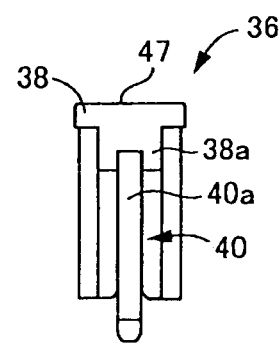

The fuse insertion portion 26 can be adapted to receive an unused fuse 36 shown in FIGS. 6A and 6B. The unused fuse 36 can be a fuse separated from an electrical circuit. For example, the unused fuse 36 can be not only a spare fuse but also a dark current fuse separated from a dark current circuit in order to provisionally shut the dark current circuit. In the present embodiment, the fuse 36 is the dark current fuse. A dimension in depth of the fuse insertion portion 26 should be set to be a size enough to receive a terminal 40 that protrudes from a main body 38 having a T-shaped block. Thus, when the terminal 40 is inserted into the fuse insertion portion 26 and a lower end surface of a main body side portion 38a above a side portion 40a of the terminal 40 contacts with an upper end surface of the fuse insertion portion 26, the fuse 36 should be disposed in the fuse insertion portion 26 so that an upper portion of the main body 38 is exposed.

In the present embodiment, the fuse insertion portion 26 should be provided on an opening side of inner peripheral surfaces perpendicular to a longitudinal direction with ribs that protrude inward in the fuse insertion portion 26 and extend in an inserting direction of the fuse 36 (in upper and lower directions in FIG. 5). Thus, it is possible to hold the terminal 40 inserted in the fuse insertion portion 26 by a suitable fitting force so that the terminal 40 can be removed from the fuse insertion portion 26 without using any tool. However, the ribs 44 are not always required. The fuse insertion portion 26 may receive the fuse 36 without causing any securing force.

Two fuse insertion portions 26 constructed above are arranged on a single straight line. Particularly, as shown in FIG. 2, the fuse insertion portions 26 of the present embodiment contain the unused fuse 36 such as a dark current fuse. The fuse insertion portions 26 are formed at positions higher than those of the other fuse mounting sections 18 and the like in order to recognize the dark current fuse even in a dark place such as a ferry.

A pair of protective walls 28 are integrated with the casing body 12 so that the protective walls 28 interpose the longitudinal opposite ends of the pair of fuse insertion portions 26. Each protective wall 28 should be formed into a generally U-shaped configuration that has a pair of opposing walls 28a and a coupling wall 28b for interconnecting the opposing walls 28a and protrudes toward the opening of the casing body 12. Thus, the protective walls 28 cover the whole of the longitudinal opposite end surfaces of the unused fuse containing section 24 and the longitudinal opposite end portions of side surfaces in a direction perpendicular to the longitudinal direction. The protective walls 28 are formed to be higher than upper end surface 42 of the fuse insertion portions 26. Projecting end surfaces 46 of the protective walls 28 are higher than distal ends of the fuse 36 inserted in the fuse containing section 26.

Further, one of the pair of protective walls 28 (a right one in FIG. 4) should be separated apart from the outer wall 30 of the fuse insertion portion 26 in the longitudinal direction. A drain hole 48 passes the casing body 12 in the vertical direction between the outer wall 30 and the protective wall 28. The drain hole 48 can have a substantially rectangular shape in cross section and be disposed adjacent to a longitudinal outer side of the fuse insertion portion 26.

Figure 7:
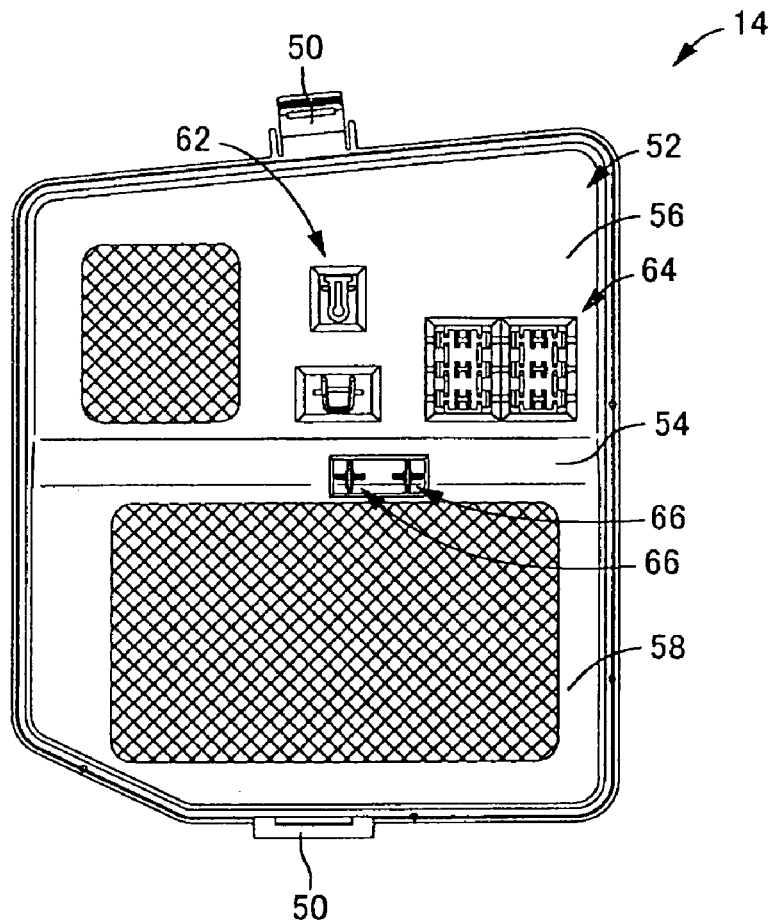
FIG. 7 is a bottom view of a cover member that constitutes the electrical junction box shown in FIG. 1.

The cover member 14 is generally attached to the casing body 12 constructed above the cover the opening 16 when the casing body is in the installed position. FIG. 7 shows a bottom surface of the cover member 14. The cover member 14 has a shape corresponding to the shape of the opening 16 in the casing body 12 to be formed into a box-like configuration that is generally open at one side. The cover member 14 is generally provided at positions corresponding to the main body side locking portions 22 of the casing body 12 on the outer peripheral surface with cover member side locking portions 50 to be engaged with the main body side locking portions 22.

In the installed position, a top wall 52 of the cover member 14 can be formed into a stepped configuration having a slant portion 54. The top wall 52 can be provided with an upper wall portion 56 that protrudes when attached to the casing body 12 and with a lower wall portion 58 disposed at a lower position than the upper wall position 56. The portions 56 and 58 are disposed at opposite sides of the slant surface 54. When the cover member 14 is attached to the casing body 12, the upper wall portion 56 defines a great clearance between the casing body 12 and the cover member 14. The upper wall portion 56 can be provided on an inner surface with a fuse puller mounting section 62 for mounting a fuse puller 60 (FIG. 2) and with a spare fuse mounting section 64.

Further, when the cover member 14 is attached to the casing body 12, the slant portion 54 may be provided on an inner surface with presser portions 66 that protrude toward the unused fuse containing section 24 at a position opposed to the section 24. The respective presser portions 66 are provided in association with the respective fuse insertion portions 26 of the unused fuse containing section 24. In the present embodiment, two presser portions 66 are disposed on a single straight line.

Figure 8:
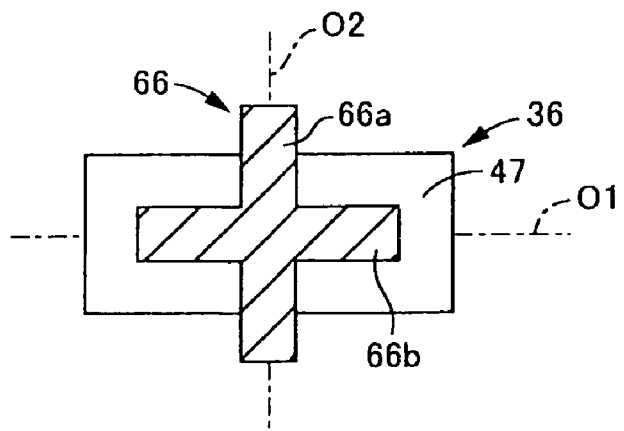
FIG. 8 is a cross section view of a presser portion.

Each presser portion 66 has a cross-shaped configuration in cross section and protrudes from the slant portion 54. As shown in FIG. 8, when the cover member 14 is attached to the casing body 12, the cross of the presser portion 66 should be substantially disposed on a central position on the distal end surface 47 of the fuse 36 and extends in longitudinal and lateral directions of the distal end surface 47. Thus, it is possible to surely bring the cross of the presser portion 66 into contact with the distal end surface 47 and to restrain an amount of turning displacement around a central axis O1 that extends in the longitudinal direction of the fuse 36 and a central axis O2 that extends in a direction perpendicular to the longitudinal direction. In addition, one (in the present embodiment, rib 66a that extends in the direction O2) of ribs 66a and 66b that constitute the cross of the presser portion 66 has a dimension that protrudes from the distal end surface 47. Thus, even if unevenness in precision of dimension occurs in the unused fuse containing section 24 and cover member 14 each made of a resin material, it is possible to surely bring the presser portions 66 into contact with the distal end surface 47.

Figure 9:
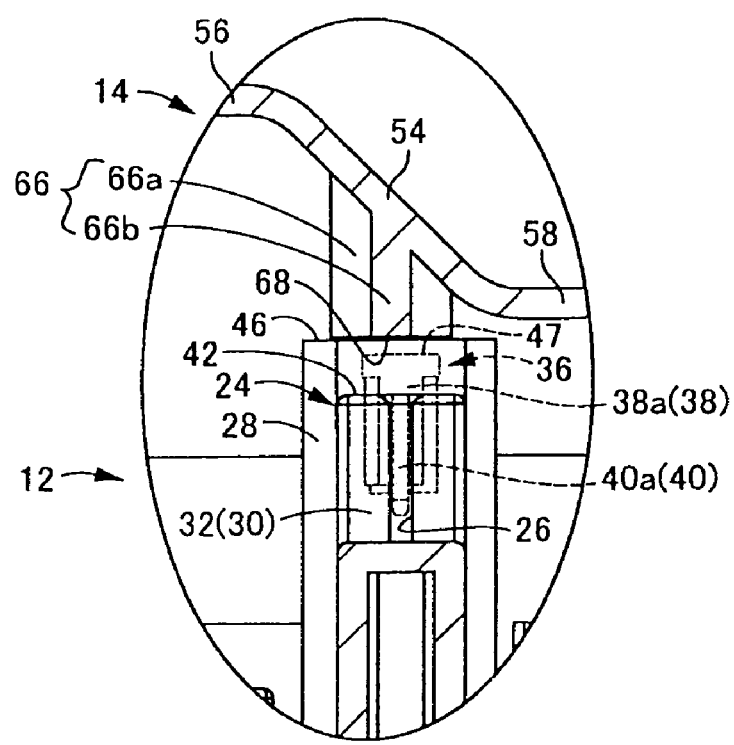
FIG. 9 is an enlarged view of an area A in FIG. 2.

In addition, as shown in FIG. 9, when the cover member 14 is attached to the casing body 12, a protruding end surface 68 of the presser portion 66 is opposed to and spaced from the distal end surface 47 of the fuse 36 inserted in the fuse insertion portion 26 by a given distance. Thus, when the cover member 14 is attached to the casing body 12, it is possible to obtain a good coupling between the cover member 14 and casing body 12.

Also, as shown in FIG. 9, the presser portion 66 protrudes from the lower wall portion 58 of the slant portion 54. Consequently, it may be possible to shorten a protruding dimension of the presser portion 66 in comparison with the case where the presser portion 66 protrudes from the upper wall portion 56 of the slant portion 54. This will reduce an amount of raw materials of the presser portion 66 and enhance strength of the presser portion 66.

In the relay box 10 constructed above, after the fuse 36 is inserted into the fuse insertion portion 26 of the unused fuse containing section 24, the cover member 14 is attached to the casing body 12 to close the opening 16. When the cover member 14 is attached to the casing body 12, the protruding end surface 68 of the presser portion 66 is spaced upward apart from the fuse 36 inserted in the fuse insertion portion 26. Consequently, if the fuse 36 happens to disconnect from the fuse insertion portion 26 due to vibrations of a vehicle or the like, the protruding end surface 68 presses against the distal end surface 47 of the fuse 36, thereby holding the fuse 36 in the fuse insertion portion 26. Particularly, in the present embodiment, because the presser portion 66 has a cross-shaped configuration in cross section, it is possible to effectively obtain a disconnection preventing function for the fuse 36 with less raw materials in comparison with the case of rectangular cross section.

Because the presser portion 66 provided on the cover member 14 exerts the disconnection preventing function for the fuse 36, it is not necessary to strongly hold the fuse 36 at the side of the unused fuse containing section 24 of the casing body 12. Thus, the fuse 36 can be easily attached to and detached from the unused fuse containing section 24 without using any tool.

Further, because the unused fuse containing section 24 may be provided with the protective walls 28, it is possible to protect the fuse 36 housed in the unused fuse containing section 24 from collision with the other members. Consequently, even if the relay box 10 is disposed in a narrow space such as an engine room and the casing body 12 is not released unless the cover member 14 is brought to the casing body 12, it is possible to prevent the fuse 36 housed in the unused fuse containing section 24 from colliding with the cover member 14. In particular, because the unused fuse containing section 24 is set to be a fuse containing section for a dark current circuit in the present embodiment and is disposed at a position higher than the other fuse mounting section 18 (near the cover member 14), the protective walls 28 can enhance a protecting effect for the fuse 36 more effectively.

In addition, the protective walls 28 are disposed at a position higher than the fuse 36 in the present embodiment. Thus, the protecting effect for the fuse 36 is exerted more effectively, a guiding function is exerted for guiding the fuse 36 to the fuse insertion portion 26, and the fuse 36 can be easily attached to and detached from the fuse insertion portion 26 in a dark place. Further, because the protective walls 28 are formed into the U-shaped configuration and are provided on the longitudinal opposite ends of the unused fuse containing section 24, even if the other member approaches the unused fuse containing section 24 from the longitudinal direction or the direction perpendicular to the longitudinal direction, the other member collides with the protective walls 28, thereby effectively preventing the other member from colliding with the fuse 36. Further, because the side opening 32 is provided between the pair of protective walls 28 having the U-shaped configurations, it is possible to easily hold the fuse 36 from a side, thereby exerting an effective protecting function while keeping facilitation of attachment and detachment of the fuse 36.

According to the a preferred embodiment, because a disconnection preventing mechanism for a fuse is provided on the cover member 14, it is not necessary to provide a special disconnection preventing mechanism on the casing body 12. Accordingly, it is possible to downsize unused fuse containing section 24 even if the protective walls 28 are provided on the casing body 12 and it is also possible to provide the disconnection preventing mechanism for a fuse and a protective mechanism for a fuse with superior space efficiency.

Although preferred embodiments are described above, it should be noted that the preferred embodiments are not limited to the particular aspects discussed above. For example, the number of the fuse insertion portion 26 provided in the unused fuse containing section 24 may vary. It may be one or more than three. A plurality of fuse insertion portions 26 may be covered with the protective walls all together. The protective wall 28 is provided on every fuse insertion portion 26.

Figure 10:
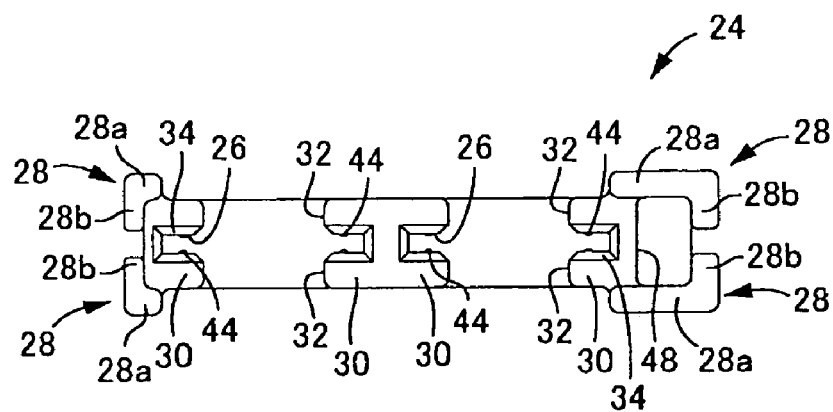
FIG. 10 is a top plan view similar to FIG. 4, illustrating the unused fuse having alternative protective walls.
Figure 11:
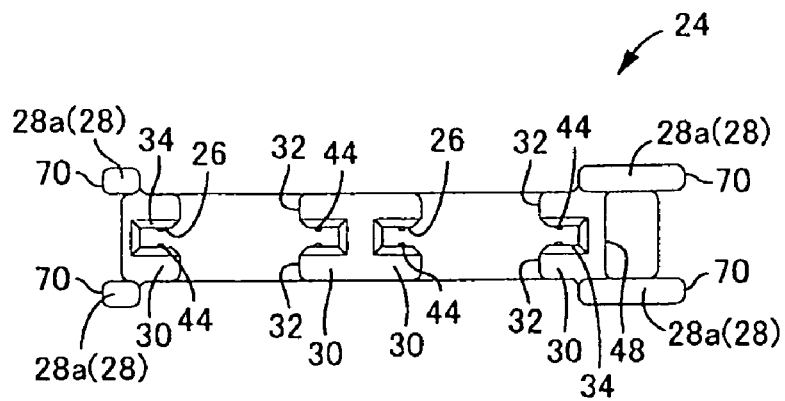
FIG. 11 is a top plan view similar to FIG. 4, illustrating the unused fuse having further alternative protective walls.
Figure 12:
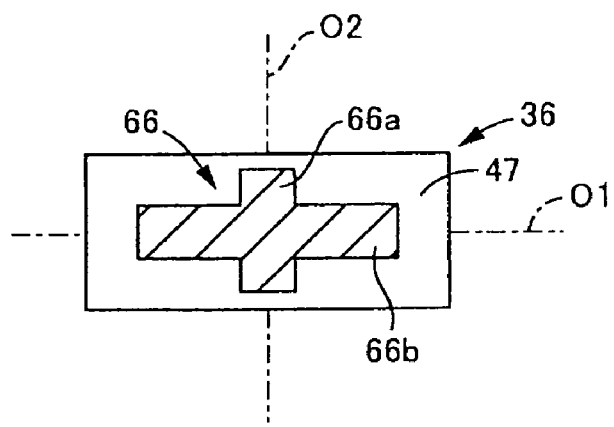
FIG. 12 is a cross section view similar to FIG. 8, illustrating the presser portion having another structure.

A shape and a position of the protective wall 28 can be set suitably in consideration of the number and position of the fuse insertion portion 26. For example, as shown in FIG. 10, the protective wall 28 may be substantially formed into an L-shaped configuration having a pair of opposed walls 28*a* and a pair of coupling walls 28*b* and may be disposed on four corners of the fuse insertion portion 26 so that the protective walls 28 cover two adjacent (orthogonal) sides of the fuse body 38 of the fuse 36 inserted in the fuse insertion portion 26. The coupling walls 28*b* may be removed. For example, as shown in FIG. 11, the protective wall 28 may be formed into an I-shaped configuration having only opposed walls 28*a*. In this case, it will be preferable that a longitudinal outer side surface 70 protrudes by a suitable length from the fuse insertion portion 26 in a longitudinal direction. This will prevent the other member from colliding with the fuse from the longitudinal direction of the fuse insertion portion 26. The protective wall 28 may be formed into an I-shaped configuration having only the coupling walls 28*b*, although it is not shown in the drawings.

Figure 13:
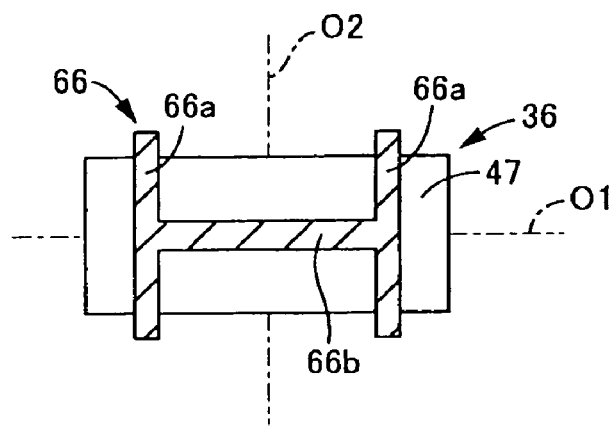
FIG. 13 is a cross section view similar to FIG. 8, illustrating the presser portion having a further another structure.

Also, a cross section of the presser portion 66 may be a rectangular shape, a circular shape, or any other suitable shape. Further, although in the embodiment described above, the single rib 66*a* of the presser portion 66 protrudes from the distal end surface 47 of the fuse 36 (see FIG. 8), both ribs 66*a* and 66*b* may be formed into a cross-shaped configuration so that they do not protrude from the distal end surface 47. Contrary to this structure, a pair of ribs 66*a* and 66*b* may extrude from the distal end surface 47. As shown in FIG. 13, a pair of ribs 66*a* extending along the central axis O2 may be coupled to a rib 66*b* extending along the central axis O1 to form an H-shaped configuration. In particular, in FIG. 13, the pair of ribs 66*a* are set to be lengths extending from the distal end surface 47 so that they can absorb an error in dimension between the unused fuse containing section 24 and the cover member 14, as is the case with the above embodiment.

It is not limited that the presser portion 66 is provided every fuse 36. For example, a plurality of presser portions 66 may protrude from the cover member 14 to form a pin configuration and are opposed to the fuse 36.

A protruding dimension of the presser portion 66 may be set so that the presser portion 66 contacts the fuse 36 inserted in the fuse insertion portion 26 when the cover member 14 is attached to the casing body 12 and so that the presser portion 66 always keep the fuse in the fuse insertion portion 26.

The drain hole 48 is not always required. A shape and a position of the drain hole 48 are not always limited to the above embodiment. For example, the drain hole 48 may be disposed adjacent to a side perpendicular to a longitudinal direction of the fuse insertion portion 26 or it may be disposed along the longitudinal direction of the fuse insertion portion 26.

What is claimed is:

1. An electrical junction box that houses an unused fuse, the electrical junction box comprising:
    a casing body further comprising:
        an opening; and
        an unused fuse containing section open toward the opening in the casing body; and
    a cover member configured to close the opening of the casing body, the cover member having a presser portion at a position opposite to the unused fuse containing section;
    wherein the presser portion is configured to prevent the unused fuse from disconnecting from the unused fuse containing section, the unused fuse containing section is configured with at least one protective wall on a periphery of the unused fuse containing section and the at least one protective wall is configured to have a height that is higher than a distal end surface of the unused fuse housed in the unused fuse containing section.

2. An electrical junction box according to claim 1, wherein the at least one protective wall is provided on at least opposite ends of the unused fuse containing section.

3. An electrical junction box according to claim 1, wherein the presser portion is configured opposite to the unused fuse containing section with to form a clearance that is spaced apart from the unused fuse when said cover member is attached to the casing body.

4. An electrical junction box according to claim 1, wherein a drain hole is provided in the casing body disposed on areas adjacent to the unused fuse containing section.

* * * * *